Patented Aug. 9, 1949

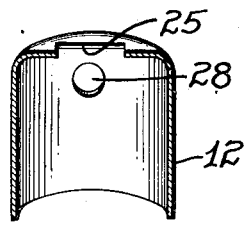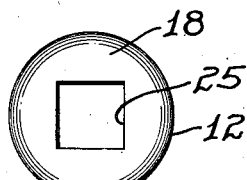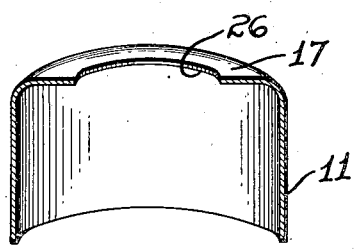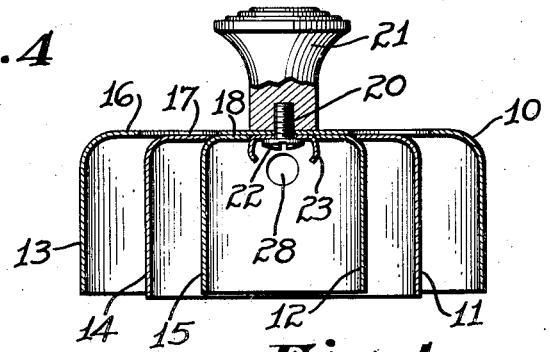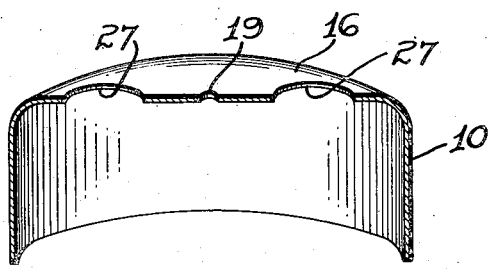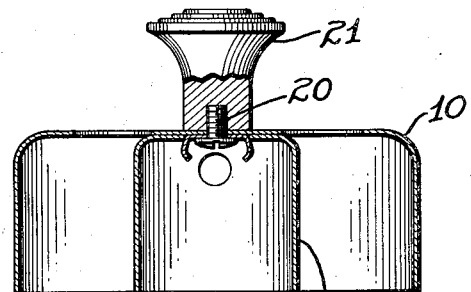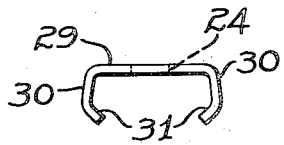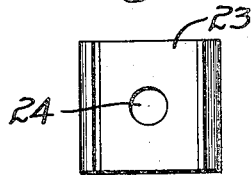

2,478,571

UNITED STATES PATENT OFFICE 2,478,571

DOUGH CUTTER

Florence B. Creider, Pasadena, Calif.

Application August 31, 1946, Serial No. 694,330

2 Claims. (Cl. 30—301)

This invention relates to a culinary instrument and is particularly directed to a device for cutting dough for making cookies, doughnuts, biscuits, tarts and other pastries. This invention finds usefulness as applied to a series of nesting of cutters which are adapted to be used individually or in combination.

It is the principal object of this invention to provide a dough cutter having an improved form of lock for maintaining a small cutter in operative position within a large cutter.

Another object is to provide a culinary implement of this type in which a lock device on one cutter is adapted to maintain either one or two other cutters in assembled relation therewith.

A further object is to provide a lock device for maintaining a plurality of cutters in assembled relation, which device is not subject to unlatching by the twisting motion applied to the cutters under conditions of use.

Other objects and advantages will appear hereinafter.

In the drawings:

Figure 1 is a transverse sectional view showing a preferred embodiment of my invention with the several cutters mounted in assembled relation for storage.

Figure 2 is a sectional view showing the small cutter in place within the large cutter, the assembly being adapted for cutting of dough for doughnuts.

Figure 3 is a perspective view, partly in section, of the small cutter.

Figure 4 is a top plan view of the small cutter.

Figure 5 is a sectional perspective view of the middle sized cutter.

Figure 6 is a similar sectional perspective view of the large cutter.

Figure 7 is a side elevation of the spring lock on an enlarged scale.

Figure 8 is a bottom plan view of the spring lock.

Referring to the drawings, the assembly of cutters shown in Figure 1 includes a large cutter 10, a medium size cutter 11 and a small cutter 12. Each of the cutters may be used individually if desired for cutting out circles in dough of the desired sizes. The cutters may be made of any preferred shape as desired, and as shown in the drawings may be cylindrical in outline for the purpose of cutting circular portions from biscuit or pastry dough. Each of the cutters is provided with a cylindrical cutting wall 13, 14 and 15, and a radially extending flange 16, 17 and 18. A small aperture 19 is formed centrally of the flange 16 on the large cutter 10, and through this opening is adapted to pass the threaded portion of the retainer screw 20 which is threaded into the handle 21. The head 22 on the screw 20 maintains the spring lock 23 in assembled relation within the large cutter 10. The screw 20 passes through the central opening 24 in the spring lock 23. The spring lock 23 is preferably substantially square in outline as shown in Figure 8, and is adapted to cooperate with the square opening 25 in the flange 18 of the smaller cutter 12 to maintain the small cutter in assembled relation within the large cutter 10. The intermediate sized cutter 14 is provided with a central opening 26 in its flange 17 which is smaller in diameter than the cutter 12, so that the coaction between the spring lock 23 and the square opening 25 may serve to maintain the intermediate cutter 11 in position within the large cutter 10 for purposes of storage.

Each of the cutters is provided with vent holes to prevent sticking of dough by suction within the cutter; thus, the large cutter 10 has a plurality of holes 27 in its upper flange 16, the cutter 11 is provided with openings 26, and the small cutter 12 has a plurality of openings 28 provided in its cylindrical surface 15 near the upper end thereof. The purpose of the holes 28 is to allow air to enter the upper end of the small cutter when it is in place within the large cutter 10 in order to prevent sticking of dough by suction within the small cutter.

The spring lock 23 is provided with a flat upper surface 29 having a pair of side clips 30 extending downwardly therefrom and tapering slightly outwardly. The lower ends of the clips 30 are directed inwardly at 31 to facilitate passage of the square opening 25 onto the lock 23. As the small cutter 12 moves upwardly with respect to the lock 23, the clips 30 deflect inwardly to allow the flange 18 to contact the flange 16 of the large cutter 10, and then the clips 30 return to their original position to resiliently maintain the cutters 12 and 10 in assembled relation.

The screw 20 is screwed into the handle 21 with sufficient force to clamp the lock 23 and flange 16 rigidly to the handle and prevent relative rotary movement. The lock is therefore solidly attached to the large cutter 10 and is not free to turn with respect thereto. The square opening 25 in the small cutter 12 cooperates with the spring lock 23 and hence provides square driving shoulders for turning the small cutter 12 when the handle 21 and large cutter 10 are rotated by hand. It is common practice when cutting out portions of pastry dough to rotate the cutter during the cutting action. The form of lock embodied in my invention and shown in the drawings hereof insures that the inner cutter 12 shall rotate with the outer cutter 10 when making doughnuts, and also prevents accidental displacement of the inner cutter 12. In previous constructions, the form of lock between the inner and outer cutters was a rotary one which was apt to become disengaged during the rotary motion employed as an incident to cutting the dough.

Having fully described my invention, it is to be understood that I do not wish to be limited to the details herein set forth, but my invention is of the full scope of the appended claims.

I claim:

1. In a device of the class described, the combination of cylindrical large and small cutters, each having a cutting wall and a radial flange, a spring lock substantially square in outline fixed centrally under the flange of the large cutter, and a square opening positioned centrally in the flange of the small cutter, the spring lock and opening cooperating to resiliently maintain the flanges of the cutters in contact and prevent relative rotary movement therebetween.

2. A nested series of dough cutters comprising in combination cylindrical large, small, and intermediate sized cutters, each of the cutters having an axially extending cutting wall and a radial flange, a polygonal spring lock fixed centrally under the flange of the large cutter, a similarly shaped opening formed centrally through the flange of the small cutter and adapted to receive the spring lock to resiliently maintain the large and small cutters against separation, the intermediate cutter having a central opening in its flange larger than the opening in the flange of the small cutter but smaller than the maximum radial dimension of the small cutter whereby the intermediate cutter may be confined within the large cutter by the small cutter.

FLORENCE B. CREIDER.

REFERENCES CITED

The following references are of record in the file of this patent:

UNITED STATES PATENTS

| Number | Name | Date |
|---|---|---|
| 841,364 | Wickwar | Jan. 15, 1907 |
| 1,797,859 | Gage et al. | Mar. 24, 1931 |